United States Patent [19]

Neigh et al.

[11] 4,224,483
[45] Sep. 23, 1980

[54] ELECTRONIC LOADED/NONLOADED TELEPHONE LOOP IDENTIFICATION CIRCUIT

[75] Inventors: James L. Neigh, Fair Haven, N.J.; Richard G. Sparber, Wheaton, Ill.

[73] Assignee: Bell Telephone Laboratories, Incorporated, Murray Hill, N.J.

[21] Appl. No.: 19,368

[22] Filed: Mar. 12, 1979

[51] Int. Cl.$^2$ ................... H04M 3/22; G01R 27/00
[52] U.S. Cl. ..................... 179/175.2 R; 179/18 FA; 324/57 R
[58] Field of Search ............... 178/45, 46; 324/57 R; 179/175.2 R, 175.2C, 175.2 D, 18 AB, 18 F, 18 FA, 174, 172, 79, 80, 78 R, 16 F

[56] References Cited

U.S. PATENT DOCUMENTS

| | | | |
|---|---|---|---|
| 3,283,242 | 11/1966 | Oliver | 324/57 R |
| 3,284,705 | 11/1966 | Dobson | 324/57 R |
| 3,612,993 | 10/1971 | Tims | 324/57 R |

Primary Examiner—Thomas A. Robinson
Attorney, Agent, or Firm—Peter Visserman

[57] ABSTRACT

An electronic loop identification circuit identifies loaded and nonloaded customer telephone loops. The loops can then be segregated to allow separate balance networks to be used for hybrid circuits which connect the customer loops to a digital switching office. Separate balance networks for loaded and nonloaded loops improve singing margin on those loops. An impedance measuring circuit (214) measures the real part of the impedance of a connected loop which is compared to a reference signal. If the real part of the loop impedance is greater than the reference signal, a loaded loop is identified; and, if the real part of the loop impedance is less than the reference signal, a nonloaded loop is identified. The circuit includes a self-calibrating arrangement which connects a reference impedance (209) to the impedance measuring circuit so that a capacitor (304) held reference signal can be set before each loop identification operation.

11 Claims, 4 Drawing Figures

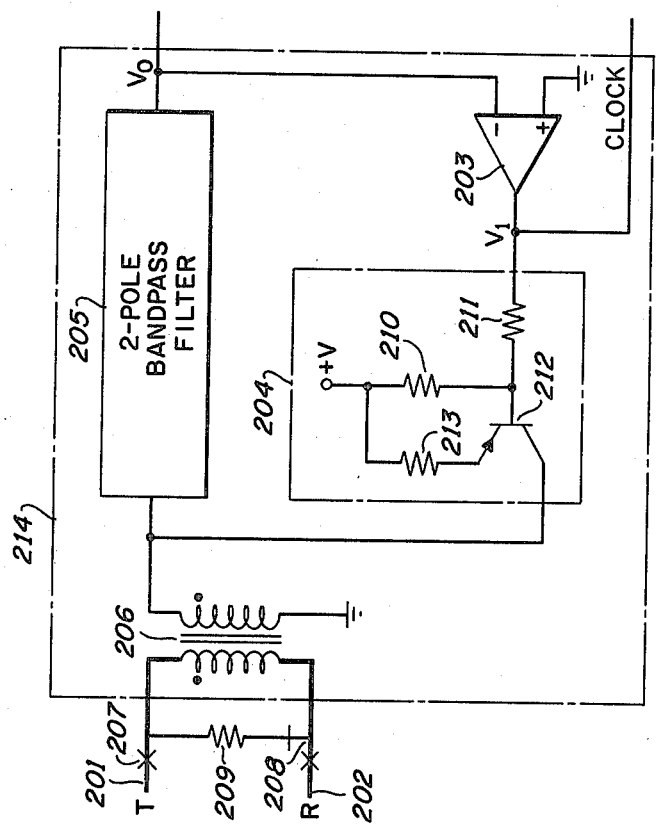
FIG. 2
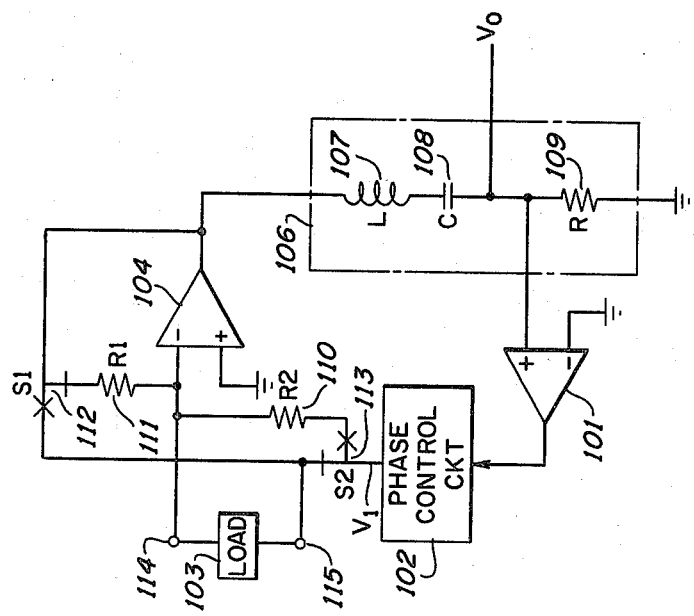
FIG. 1
FIG. 4
| FIG. 2 | FIG. 3 | ns
ELECTRONIC LOADED/NONLOADED TELEPHONE LOOP IDENTIFICATION CIRCUIT

CROSS-REFERENCE TO RELATED APPLICATIONS

This application is related to the application of R. G. Sparber, Serial No. 019,367, entitled "Impedance/Admittance Measuring Circuit" which was filed concurrently herewith and assigned to the assignee of the present application.

BACKGROUND OF THE INVENTION

This invention relates to the identification of telephone customer loops as loaded loops and nonloaded loops and, more particularly, to an arrangement for electronically performing such customer loop identification. For this application, a loaded loop is defined as a customer 2-wire metallic loop into which lumped inductive loads have been connected to reduce the effects of distributed loop capacitance in accordance with well-known telephone loop design practices.

Until recently, local telephone switching offices generally switched telephone messages as analog signals on 2-wire metallic switching paths. Such analog local switching offices are nearly transparent to the transmission of telephone messages and introduce minimal signal loss (typically less than 0.5 db) across the switching network. Accordingly, present transmission design practices only include an allowance for this negligible cross office loss.

However, with the introduction of local digital switching, cross office loss may no longer be negligible. The use of a digital switch, which is inherently a 4-wire device, with existing analog transmission facilities requires a 2-wire to 4-wire to 2-wire conversion. This conversion is performed by hybrid circuits with their attendant stability problems. That is, a signal injected into the forward transmission path can pass across the hybrid and return to the starting point through the reverse transmission path. The resulting return signals can cause reverberations which make telephone messages sound distorted or give the voice signals a hollow sound. If the return signals are sufficiently high, the circuit goes into oscillation which is referred to as singing. The stability of the hybrid circuits can be assured by increasing the loss around the 4-wire path through the digital switch. However, any increase in cross office loss beyond that encountered in an analog switching office is in conflict with existing transmission design practices and could result in degradation of transmitted signals.

A well-known solution to the dilemma of providing low cross office loss while preventing singing is to provide improved balance networks for the hybrids. Improved balance networks provide better impedance balance at the hybrids to reduce the return signals. It is further known that additional singing margin can be gained by utilizing two different balance networks, one for loaded loops and one for nonloaded loops. This separate treatment for loaded loops and nonloaded loops is referred to as "loop segregation".

Local telephone switching offices maintain office records which identify each of the customers' loops and indicate whether those loops are loaded or nonloaded. By referring to the office records, loop segregation can be performed by connecting the appropriate balance network in accordance with the records. Unfortunately, office records are often inaccurate and out of date. Additional error may be introduced by inaccurate use of the office records and, as the office records are frequently updated, frequent changes are required. Furthermore, a loop which is properly identified in the office records but improperly designed may have the quality of service degraded by applying the balance network indicated by the office records. These problems lead to administrative headaches as well as introducing a high probability of error in the treatment applied to the customer loops served by a local switching system.

SUMMARY OF THE INVENTION

Our electronic loop identification circuit eliminates these problems by allowing local telephone switching offices to electronically perform loop identification. In accordance with our invention, each customer loop is connected to an impedance measuring circuit which generates an output signal representative of the real part of the impedance of a connected load. The output signal of the impedance measuring circuit is compared to a reference signal. If the magnitude of the output signal is greater than the reference signal, a loaded loop signal is generated; and, if the magnitude of the output signal is less than the reference signal, a nonloaded loop signal is generated.

The impedance measuring circuit comprises an excitation signal generator and a two pole bandpass filter circuit connected together to form a feedback loop such that the circuit oscillates at approximately the center frequency of the filter circuit. The excitation signal is applied to a load and the resulting response signal is passed through the filter. The phase relations imposed by the feedback loop result in the magnitude of the filter output signal being proportional to the real part of the impedance of the load which is driven by the excitation signal. The illustrative embodiment utilizes a voltage controlled current source as the excitation signal generator, an active two pole bandpass filter, and a comparator circuit to connect the two into a feedback loop.

The reference signal to which the filter output signal is compared is generated by the loop identification circuit prior to each loop identification operation. The generation of the reference signal prior to each loop identification calibrates the loop identification circuit to correct any variations in circuit components due to time and temperature changes, and serves to avoid costly manufacturing techniques and high cost components. The loop identification circuit initially connects a reference load to the impedance measuring circuit. An initially fully charged capacitor is discharged until a comparator circuit which compares the charge on the capacitor to the output signal of the impedance measuring circuit indicates that the two signals have intersected. At that time the capacitor discharging is discontinued such that the potential on the capacitor is equal to the desired reference voltage. The loop identification circuit disconnects the reference load and connects a customer loop to be identified. After a defined stabilizing time period has elapsed, the output signal of the impedance measuring circuit is compared to the reference voltage on the capacitor. The result of the comparison is stored by a flip-flop circuit and a completion signal is generated.

Analysis of data collected in a Bell System customer loop survey led to the recognition that loop identification can be performed by measuring only the real parts of the impedances of customer loops. Customer loops which present an on-hook impedance at 3200 hz having a real part greater than approximately 500 ohms were observed to be loaded while those having an on-hook impedance with a lesser real part were observed to be predominantly nonloaded loops.

Advantageously, the loop identification circuit can be connected in turn to each of the customer loops connected to a switching office so that the customer loops can be identified as loaded or nonloaded and treated accordingly for loop segregation. Automatic identification by the loop identification circuit of our invention eliminates the administrative problems encountered when office records are relied upon for loop segregation. Furthermore, by actually measuring the customers' loops, the best selection of the two alternative balance networks can be made regardless of inaccurate office records or improperly designed loops.

BRIEF DESCRIPTION OF THE DRAWING

The invention will be better understood from the following detailed description when read with reference to the drawing in which:

FIG. 1 is an illustrative schematic diagram of a measuring circuit for measuring the real and imaginary parts of impedances and admittances of a connected load;

FIG. 2 is an illustrative schematic diagram of an impedance measuring circuit which is used in a loop identification circuit and measures the positive real part of the impedance of a connected load;

FIG. 4 is a composite drawing indicating how FIGS. 2 and 3 are arranged to form a schematic diagram of an electronic loaded/nonloaded telephone loop identification circuit.

DETAILED DESCRIPTION

Figure 3:
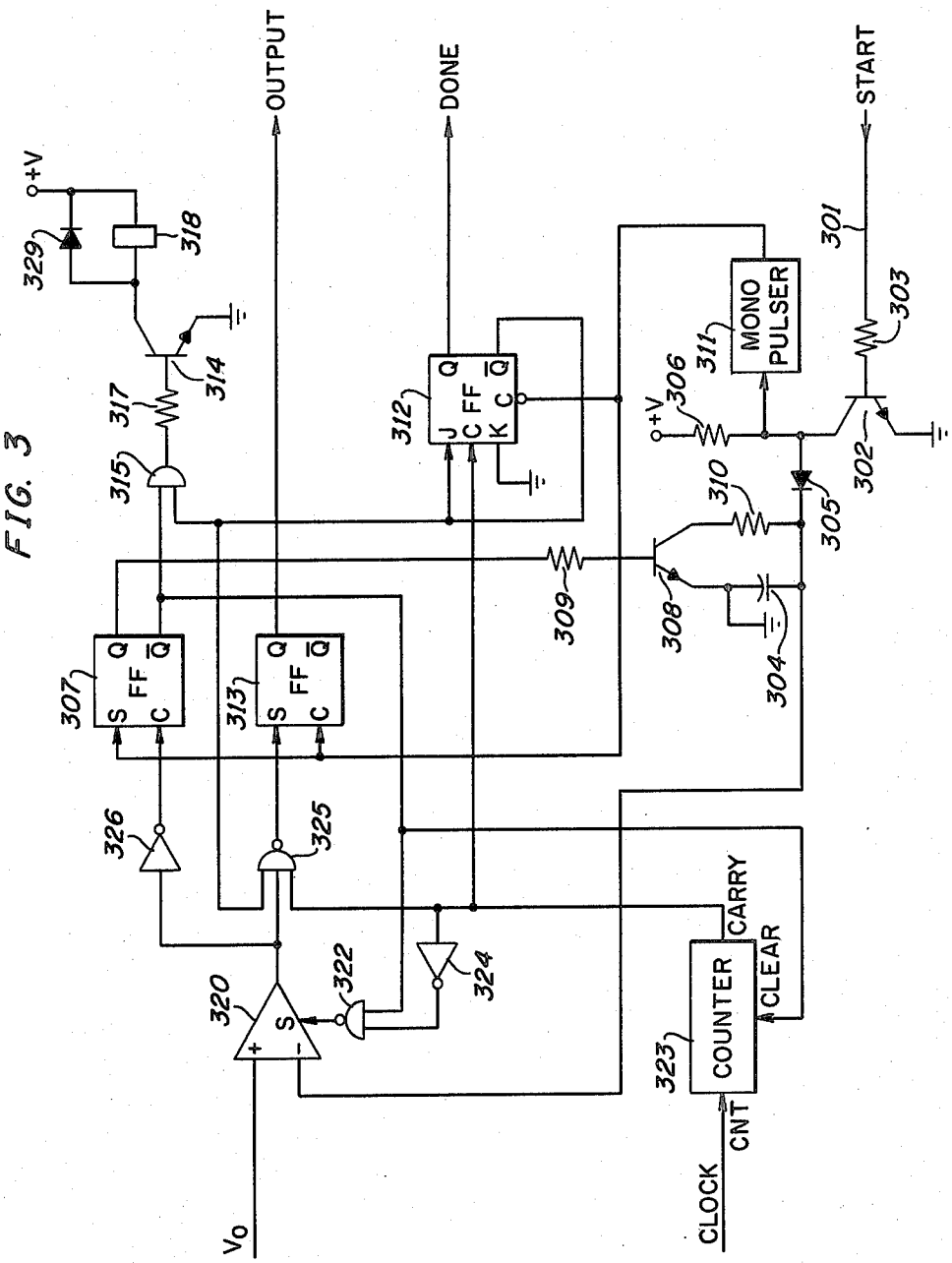
FIG. 3 is a schematic diagram of one embodiment of circuitry used to compare the output signal of the impedance measuring circuit of FIG. 2 to a reference signal and for generating the reference signal.

FIG. 1 is a schematic diagram of an illustrative embodiment of a novel impedance/admittance measuring circuit which can measure the real or imaginary parts of the complex impedance or the complex admittance of a connected load. The measuring circuit is a positive feedback oscillatory loop comprising the comparator 101, the phase control circuit 102, the load 103, the terminals 114 and 115 for connecting the load to the measuring circuit, the operational amplifier (OP amp) 104, the resistors 110 and 111, the switch contact sets 112 and 113 of a function selection switch, and the two pole bandpass filter 106 which comprises the inductor 107, the capacitor 108 and the resistor 109. The load 103 is selectively connected by the switch contacts 112 and 113 as the input element or the feedback element of the OP amp 104 for measuring admittances or impedances, respectively. The function selection switch contacts are represented as detached contacts. A cross or x on a conductor path represents make or normally open contacts through which a path is completed only when the switch is operated. A line perpendicularly drawn across a conductor path represents break or normally closed contacts through which a path is completed only when the switch is not operated. A combination of make and break contacts is referred to as transfer contacts which complete a path from a common contact to a make contact only when the switch is operated and complete a path from the common contact to a break contact only when the switch is not operated.

By setting the proper phase relation between the excitation signal $V_1$ and the output voltage $V_0$ via the phase control circuit 102, the measuring circuit oscillates and the magnitude of the ouput voltage $V_0$ is proportional to the real or imaginary part of the impedance if the function selection switch is operated or the admittance if the switch is not operated, of the connected load 103. A variety of phase control circuits are well known in the prior art as disclosed in *Circuits for Electronics Engineers* edited by Samuel Weber, and published by McGraw-Hill Incorporated in 1977, at page 278 et seq.

If the function selection switch comprising the contact sets 112 and 113 is operated and the load 103 is represented by an impedance $Z_1$, the output voltage $V_0$ is related to the excitation signal $V_1$ by the following general equation:

$$V_0 = \left[ -\frac{Z_1}{R_2} \right] \left[ \frac{R}{R + j(\omega L - \frac{1}{\omega c})} \right] V_1$$

Solving for $Z_1$ yields:

$$Z_1 = \left[ R + j(\omega L - \frac{1}{\omega c}) \right] \left[ -\frac{R_2}{R} \right] \frac{V_0}{V_1}$$

The phase relation between the output voltage $V_0$ and the excitation signal $V_1$ determines whether the real part or the imaginary part of an admittance or impedance is measured and whether the real part of imaginary part which can be measured is positive or negative. For example, if a zero phase shift is introduced by the phase control circuit 102 such that the output voltage $V_0$ and the excitation signal $V_1$ are in phase, the equation for the impedance $Z_1$ becomes:

$$Z_1 = -\frac{R_2 V_0}{V_1} + j\frac{R_2 V_0}{R V_1} \left[ \frac{1}{\omega c} - \omega L \right]$$

For this phase relation, the output voltage $V_0$ is proportional to the real part of the impedance connected as the load 103 for impedances having a negative real part. This is true regardless of the imaginary part of the impedance. However, if a connected load impedance has a positive real part, the circuit fails to oscillate and the output voltage $V_0$ goes to zero.

To measure the real part of an impedance having a positive real part, a 180 degree phase relation must be introduced between the output voltage $V_0$ and the excitation signal $V_1$. For a 180 degree phase relation between $V_0$ and $V_1$, $V_0/V_1$ will be equal to minus the magnitude of $V_0/V_1$ which leads to the following equation for the impedance $Z_1$:

$$Z_1 = R_2 \left| \frac{V_0}{V_1} \right| + j\frac{R_2}{R} \left[ \omega L - \frac{1}{\omega c} \right] \left| \frac{V_0}{V_1} \right|$$

For a given value of $V_0$, the plot of the impedances which will produce that $V_0$ is a straight line parallel to the imaginary axis and crossing the real axis at a positive real part defined as $R_2$ times the magnitude of $V_0/V_1$. Accordingly, $V_0$ for this case is proportional to the positive real part of the connected load impedance.

By making the phase relation of the excitation signal $V_1$ to the output voltage $V_0$ +90 degrees or −90 degrees, the output voltage $V_0$ becomes proportional to the positive imaginary part or the negative imaginary part, respectively, of the impedance connected as the load 103. For a positive 90 degree phase relation, $V_0/V_1$ is equal to $-j$ times the magnitude of $V_0/V_1$. The equation for the impedance $Z_1$ then becomes:

$$Z_1 = \frac{R_2}{R} \left| \frac{V_0}{V_1} \right| \left[ \frac{1}{\omega c} - \omega L \right] + jR_2 \left| \frac{V_0}{V_1} \right|$$

For a given value of $V_0$, the plot of the impedances which will produce that $V_0$ is a straight line parallel to the real axis and crossing the imaginary axis at a positive imaginary part defined as $R_2$ times the magnitude of $V_0/V_1$. Accordingly, $V_0$ for this case is proportional to the imaginary part of the impedance connected as the load 103.

For a negative 90 degree phase relation, $V_0$ is equal to $j$ times the magnitude of $V_0/V_1$ and the equation for the impedance $Z_1$ becomes the following:

$$Z_1 = \frac{R_2}{R} \left| \frac{V_0}{V_1} \right| \left[ \omega L - \frac{1}{\omega c} \right] - jR_2 \left| \frac{V_0}{V_1} \right|$$

For a given value of $V_0$, the plot of the impedances which will produce that $V_0$ is a straight line parallel to the real axis and crossing the imaginary axis at a negative imaginary part defined as $-R_2$ times the magnitude of $V_0/V_1$. Accordingly, $V_0$ is proportional to the negative imaginary part of an impedance connected as the load 103.

If the real or imaginary parts of an admittance are to be measured, the function selection switch is set to admittance or placed in the not operated position. If the load is represented as $Z_2$, the equation for the admittance $Y_2$, which is the reciprocal of the impedance $Z_2$, is as follows:

$$Y_2 = \left[ R + j(\omega L - \frac{1}{\omega c}) \right] \left[ -\frac{1}{R_1 R} \frac{V_0}{V_1} \right]$$

For a zero phase relation between the output voltage $V_0$ and the excitation signal $V_1$, the equation for the admittance $Y_2$ becomes:

$$Y_2 = -\frac{1}{R_1} \left| \frac{V_0}{V_1} \right| + j \frac{1}{R_1 R} \left| \frac{V_0}{V_1} \right| \left[ \frac{1}{\omega c} - \omega L \right]$$

For a given value of $V_0$, the plot of all admittances which will produce that $V_0$ is a straight line parallel to the imaginary axis and crossing the real axis at a negative real part defined as $-1$ times the magnitude of $V_0/V_1$ divided by $R_1$. Accordingly, $V_0$ is proportional to the negative real part of an admittance connected as the load 103.

If a phase relation of 180 degrees is imposed between the output voltage $V_0$ and the excitation signal $V_1$, $V_0$ will be proportional to the positive real part of the admittance $Y_2$. An analysis similar to that performed above for an impedance measurement shows that a phase relation of +90 degrees and −90 degrees between the excitation signal $V_1$ and the output voltage $V_0$ will allow the measurement of a positive imaginary part of an admittance and a negative imaginary part of an admittance, respectively.

FIG. 2 is a schematic diagram of the impedance measuring circuit 214 for measuring the real part of the impedance of a connected load. The impedance measuring circuit 214 comprises the comparator 203, the current source 204, the transformer 206, and the two pole bandpass filter 205. The relay make contacts 207 and the relay transfer contacts 208 selectively connect either the reference resistor 209 or a customer loop which is connected to the tip and ring terminals 201 and 202.

A fixed amplitude square wave excitation signal generated by the current generator 204 is coupled to a connected load via the transformer 206. The signal resulting from applying the excitation signal to the connected load is filtered by the two pole bandpass filter 205 resulting in the nearly sinusoidal output voltage $V_0$ which has a magnitude proportional to the positive real part of the impedance of the connected load. The output voltage $V_0$ controls the comparator 203 to form an oscillatory positive feedback loop for loads having a positive real part. The comparator 203 in response to the output voltage $V_0$ generates a fixed amplitude square wave signal which controls the current source 204 and serves as a clock signal for the circuitry shown in FIG. 3 as will be described hereinafter.

The impedance measuring circuit 214 of FIG. 2 is an embodiment of the generalized impedance/admittance measuring circuit of FIG. 1 which is set up to measure the positive real part of the impedance of the load 103. The correlation between the measuring circuits of FIG. 1 and FIG. 2 is most easily observed by noting that the OP amp 104 and the resistor 110 form a current source which drives the load 103 if the function selection switch is operated. Further, the negative input terminal of the OP amp 104 is at virtual ground such that one side of the load to be measured is effectively at ground potential in both circuits. Finally, the phase shifts around the feedback loop of the impedance measuring circuit 214 correspond to those of the circuit of FIG. 1 if the circuit of FIG. 1 is set up to measure the positive real part of the impedance of the load 103. A mathematical analysis similar to that previously performed relative to FIG. 1 shows that the magnitude of the output voltage $V_0$ of the impedance measuring circuit 214 is proportional to the positive real part of the impedance of a connected load.

The output of the comparator 203 is a square wave having a positive amplitude approximately equal to the positive supply voltage of the comparator 203 and a negative amplitude approximately equal to the negative supply voltage of the comparator 203. The resistors 210 and 211 form a voltage divider to set the voltage level at the base terminal of the transistor 212. If the output signal of the comparator 203 is high, the transistor 212 is turned off. If the output signal of the comparator 203 is low, the transistor 212 is turned on and the current flow from the collector terminal is equal to the supply voltage +V minus the emitter-base voltage drop of the transistor 212, minus the base voltage of the transistor 212, divided by the resistance value of the resistor 213, and multiplied by the $\alpha$ of the transistor 212.

A two pole active filter which can be utilized in the impedance measuring circuit of FIG. 2 is fully described in *Burr Brown Operational Amplifiers Design and Applications* edited by Tobey, Graeme, and Huelsman, and published by McGraw-Hill Incorporated in 1971, at page 293 et seq.

FIG. 3 is a schematic diagram of an illustrative embodiment of circuitry for utilizing the impedance measuring circuit of FIG. 2 to identify loaded loops and nonloaded loops. For this application, a loaded loop is defined as a telephone customer 2-wire metallic loop into which lumped inductive loads have been connected to reduce the effects of distributed loop capacitance in accordance with well-known telephone loop design practices. Prior to a loop identification operation, the signal on the start lead 301 is low which maintains the transistor 302 in its off state via the current limiting resistor 303. While the transistor 302 is in its off state, the capacitor 304 is charged through the diode 305 and the resistor 306 to approximately the supply voltage +V. The flip-flop 307 is in its clear state which maintains the transistor 308 in its off state via the current limiting resistor 309 so that the capacitor 304 is not discharging via the resistor 310 and the transistor 308.

The signal on the start lead 301 goes high to signal the start of a loop identification operation. A high signal on the start lead 301 places the transistor 302 into its on state which clamps the anode of the diode 305 to approximately ground potential to stop the charging of the capacitor 304 through the resistor 306 and the diode 305. The turn on of the transistor 302 also triggers the monostable multivibrator or monopulser 311 which provides a short ground potential synchronizing pulse to clear the flip-flop 312 and the flip-flop 313 and to set the flip-flop 307.

Setting the flip-flop 307 places the transistor 308 into its on state which starts to discharge the capacitor 304 through the resistor 310 and the transistor 308. The $\overline{Q}$ output signal from the flip-flop 307 is low so that the transistor 314 is in an off state via the AND gate 315 and the current limiting resistor 317. Accordingly, the relay coil 318 is de-energized. The relay contacts 207 and 208 shown in FIG. 2 are controlled by the relay coil 318. With the relay coil 318 de-energized, the reference resistor 209 is connected to the impedance measuring circuit via the relay contacts 208.

The impedance measuring circuit 214 of FIG. 2 provides an output voltage $V_0$ having a magnitude which is proportional to the real part of the connected impedance, in this case, proportional to the resistance value, 463 ohms for the loop identification circuit, of the reference resistor 209. The sinusoidal voltage $V_0$ is compared to the voltage on the capacitor 304 by the comparator 320. A high signal is applied to the strobe input S of the comparator 320 to enable the output signal of the comparator 320. The high signal on the strobe input S of the comparator 320 is provided by the low signal on the $\overline{Q}$ output of the flip-flop 307 and the NAND gate 322.

The low signal on the $\overline{Q}$ output of the flip-flop 307 and the low signal from the counter circuit 323 force the output signals of the NAND gates 322 and 325 and the inverter 324 to be high. The voltage on the capacitor 304 is initially greater than the peak magnitude of the $V_0$ signal. Accordingly, the output signal of the comparator 320 is low and the output of the inverter 326 is high. Due to the discharge through the resistor 310 and the transistor 308, the voltage on the capacitor 304 decreases gradually relative to the period of oscillation of the impedance measuring circuit 214, which is approximately 3200 hz for the loop identification circuit. Eventually the voltage on the capacitor 304 crosses at or near a peak of the $V_0$ signal and the output signal of the comparator 320 goes high. A high output signal from the comparator 320 forces the output signal of the inverter 326 to go low which clears the flip-flop 307. A high signal on the $\overline{Q}$ output of the flip-flop 307 clamps the output signal of the comparator 320 low via the NAND gate 322 and energizes the relay coil 318 through the AND gate 315, the current limiting resistor 317 and the transistor 314.

Energizing the relay coil 318 operates the relay contacts 207 and 208 shown in FIG. 2 to connect the unknown loop impedance connected to the terminals 201 and 202 to the impedance measuring circuit 214 of FIG. 2 and to disconnect the reference resistor 209 therefrom. Clearing the flip-flop 307 also removes the hard clear on the binary counter 323 and it begins to count clock pulses generated by the impedance measuring circuit of FIG. 2. The low signal on the Q output of the flip-flop 307 turns off the transistor 308 to stop the discharge of the capacitor 304 so that the voltage on the capacitor 304 is representative of the real part of the reference resistor 209 which was connected across the impedance measuring circuit 214, i.e., the reference resistor 209 itself. After counting 64 clock pulses, the carry output signal on the counter 323 goes high to unclamp the output of the comparator 320 through the inverter 324 and the NAND gate 322. The counter 323 counting to 64 provides a time period during which the transient signals associated with switching the loads connected to the impedance measuring circuit can settle down. After this delay period, the output voltage $V_0$ of the impedance measuring circuit can be reliably compared to the reference voltage on the capacitor 304. Strobing the output signal from the comparator 320 with the carry output signal from the counter circuit 323 also serves to reduce the noise susceptibility of the loop identification circuit.

If the peak value of the output voltage $V_0$ is less than the reference voltage on the capacitor 304, the output signal of the comparator 320 is low and the flip-flop 313 remains in its cleared state so that its Q output signal is low. If the peak value of the output voltage $V_0$ is greater than the reference voltage on the capacitor 304, the output signal of the comparator 320 is high during the portion of the $V_0$ waveform which exceeds the reference voltage and the flip-flop 313 is set so that its Q output signal is high. The next clock pulse counted by the counter circuit 323 causes the output signal of the counter circuit 323 to go low which clocks the flip-flop 312 and places it into its set state so that its Q output signal is high indicating that the comparison is complete and that the result is indicated by the signal on the Q output of the flip-flop 313. When the start signal again goes low, the transistor 302 is turned off so that the capacitor 304 can again charge to approximately the supply voltage +V. The diode 329 serves to suppress high voltage noise spikes which are generated when the current flow through the relay coil 318 is abruptly halted.

It is to be understood that the above described embodiment is merely illustrative of the principles of the invention and that other arrangements may be devised by those skilled in the art without departing from the spirit and scope of the invention.

What is claimed is:

1. A communications loop testing arrangement comprising an impedance measuring means (214) for measuring the impedance of a connected load; characterized in that said impedance measuring means is adapted to generate an impedance signal having an amplitude representative of the real part of the impedance of said connected load, and said loop testing arrangement further comprises a reference signal source (304) for providing a reference signal having a reference amplitude and comparator means (320) for comparing said impedance signal to said reference signal and for generating an output signal, whereby said output signal indicates a nonloaded loop if the real part of the impedance of a connected loop is less than a reference value and indicates a loaded loop if the real part of the impedance of a connected loop is greater than the reference value.

2. The arrangement in accordance with claim 1 characterized in that said impedance measuring means comprises:

generator means (203, 204) and applying said excitation signal to said connected load for generating an excitation signal; and filter means (205) connected to said generator means and to said connected load for generating an output signal representative of the amplitude and phase of the response signal which results from applying said excitation signal to said connected load, said generator means being responsive to the output signal of said filter means for generating said excitation signal in phase with the output signal of said filter means, whereby an oscillatory feedback loop is formed.

3. The arrangement in accordance with claim 2 characterized in that said generator means comprises a voltage controlled current source (204).

4. The arrangement in accordance with claim 2 characterized in that said filter means comprises a two pole bandpass filter.

5. The arrangement in accordance with claim 2 characterized in that said generator means comprises a comparator circuit for comparing the output signal of said filter means to a fixed potential.

6. The arrangement in accordance with claim 2 characterized in that said impedance measuring means further comprises a transformer circuit (206) for coupling said excitation signal to said connected load.

7. The arrangement in accordance with claim 1 characterized in that said reference signal source comprises a capacitor (304) and said arrangement further comprises reference means (207, 208, 209, 302, 305, 306, 307, 308, 310, 318) responsive to the output signal of said comparator means for adjusting the amplitude of said reference signal, whereby said loop testing arrangement is self-calibrating.

8. The arrangement in accordance with claim 7 characterized in that said reference means comprises:

a reference impedance (209);

connector means (318, 207, 208) for switchably connecting said reference impedance to said impedance measuring means; and generator means (302, 305, 306, 307, 308, 310) for generating said reference signal in response to the output signal of said comparator means while said reference impedance is connected to said impedance measuring means.

9. The arrangement in accordance with claim 8 characterized in that said generator means comprises:

charging means (302, 305, 306) responsive to a start signal for charging said capacitor;

discharging means (308, 310) responsive to a stop signal for discharging said capacitor; and control means (307) responsive to the output signal of said comparator means for generating said stop signal.

10. The arrangement in accordance with claim 9 characterized in that said connector means is responsive to said control means to connect a loop to said impedance measuring means and to disconnect said reference impedance therefrom and said loop testing arrangement further comprises delay means (323) for delaying a defined period of time before said impedance signal generated in response to said loop is compared to the generated reference signal, whereby transients introduced by the switched connection of said unknown loop impedance have settled sufficiently to allow a reliable comparison.

11. The arrangement in accordance with claim 10 characterized in that said delay means comprises a counter circuit for counting periodically occurring pulses.

* * * * *